Figure 4:
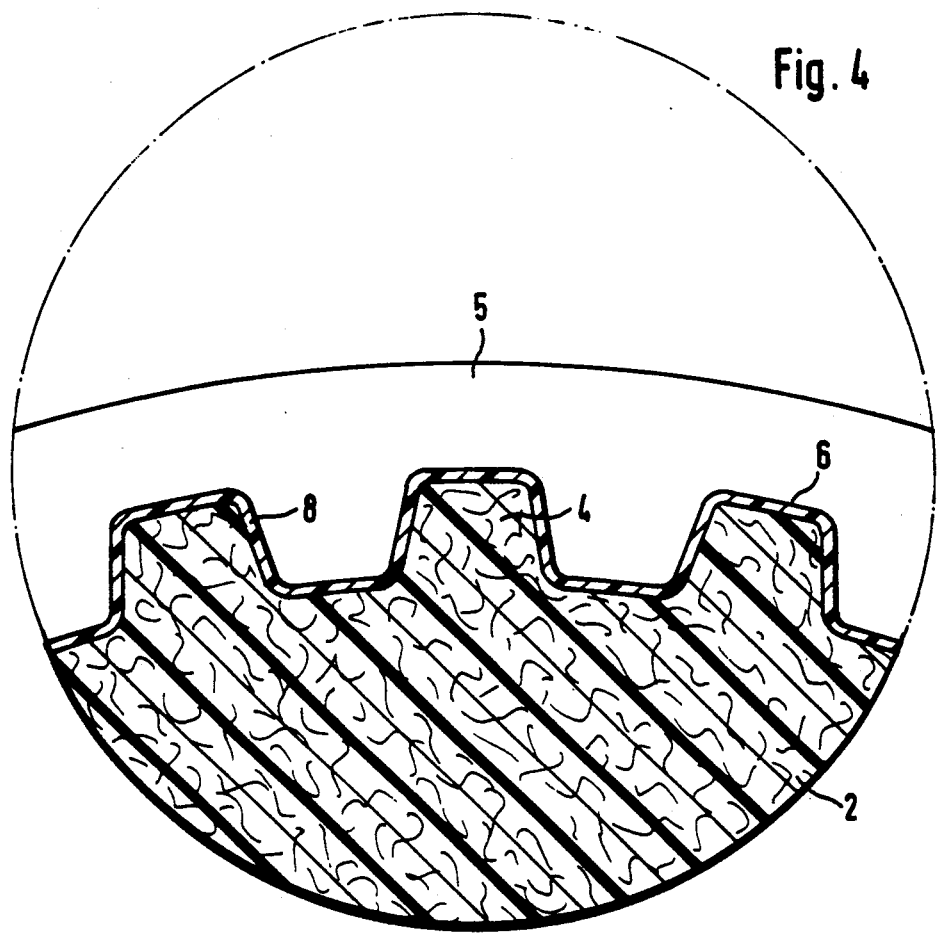

United States Patent [19]

Rabe

[11] Patent Number: 5,106,672
[45] Date of Patent: Apr. 21, 1992

[54] STRUCTURAL ELEMENT MADE OF REINFORCED POLYMERIC MATERIAL

[75] Inventor: Jürgen Rabe, Aurachtal, Fed. Rep. of Germany

[73] Assignee: INA Walzlager Schaeffler KG, Fed. Rep. of Germany

[21] Appl. No.: 617,788

[22] Filed: Nov. 26, 1990

Related U.S. Application Data

[63] Continuation of Ser. No. 820,258, Jan. 17, 1986, abandoned.

[30] Foreign Application Priority Data

Jan. 31, 1985 [DE] Fed. Rep. of Germany ....... 3503214

[51] Int. Cl.$^5$ ................. B32B 33/00; F16C 33/22; F16D 69/00; F16H 55/06; F16H 55/48
[52] U.S. Cl. ................. 428/213; 74/215; 74/468; 74/DIG. 10; 184/5; 184/100; 252/12; 252/12.4; 252/12.6; 254/902; 264/241; 264/299; 384/297; 384/463; 384/909; 384/911; 428/908.8
[58] Field of Search ............... 74/215, 468, DIG. 10; 184/5, 100; 252/12, 12.4, 12.6; 254/902; 384/297, 463, 909, 911; 428/908.8, 213; 474/177

[56] References Cited

U.S. PATENT DOCUMENTS

| | | | |
|---|---|---|---|
| 2,720,119 | 10/1955 | Sherman | 384/297 |
| 2,815,253 | 12/1957 | Spriggs | 384/909 |
| 3,033,623 | 5/1962 | Thomson | 384/299 |
| 3,318,727 | 5/1967 | Boenig et al. | 428/908.8 |
| 3,420,115 | 1/1969 | Lang | 74/215 |
| 3,926,818 | 12/1975 | Albertson | 252/12.4 |
| 3,993,371 | 11/1976 | Orndorff | 384/297 |
| 4,196,249 | 4/1980 | Patrichi | 384/297 |
| 4,366,609 | 1/1983 | Speer | 474/177 |
| 4,405,683 | 9/1983 | Renker | 428/908.8 |
| 4,623,590 | 11/1986 | Hodes | 428/908.8 |

FOREIGN PATENT DOCUMENTS

| | | | |
|---|---|---|---|
| 2537674 | 6/1984 | France | 384/909 |
| 135265 | 10/1980 | Japan | 74/DIG. 10 |
| 219957 | 8/1968 | U.S.S.R. | 74/DIG. 10 |

OTHER PUBLICATIONS

*IBM Technical Disclosure Bulletin*, 28 (1), Jun. 1985, pp. 93–94.

Primary Examiner—James C. Cannon
Attorney, Agent, or Firm—Bierman and Muserlian

[57] ABSTRACT

A structural element made of a castable or extrudable polymeric material reinforced by fillers, said structural element having a contact surface in sliding engagement with another element, the structural element being provided on its contact surface with a layer, thin in comparison to the structural element's dimensions, of polymeric material free of fillers, the said layer being unitary with the structural element.

7 Claims, 3 Drawing Sheets

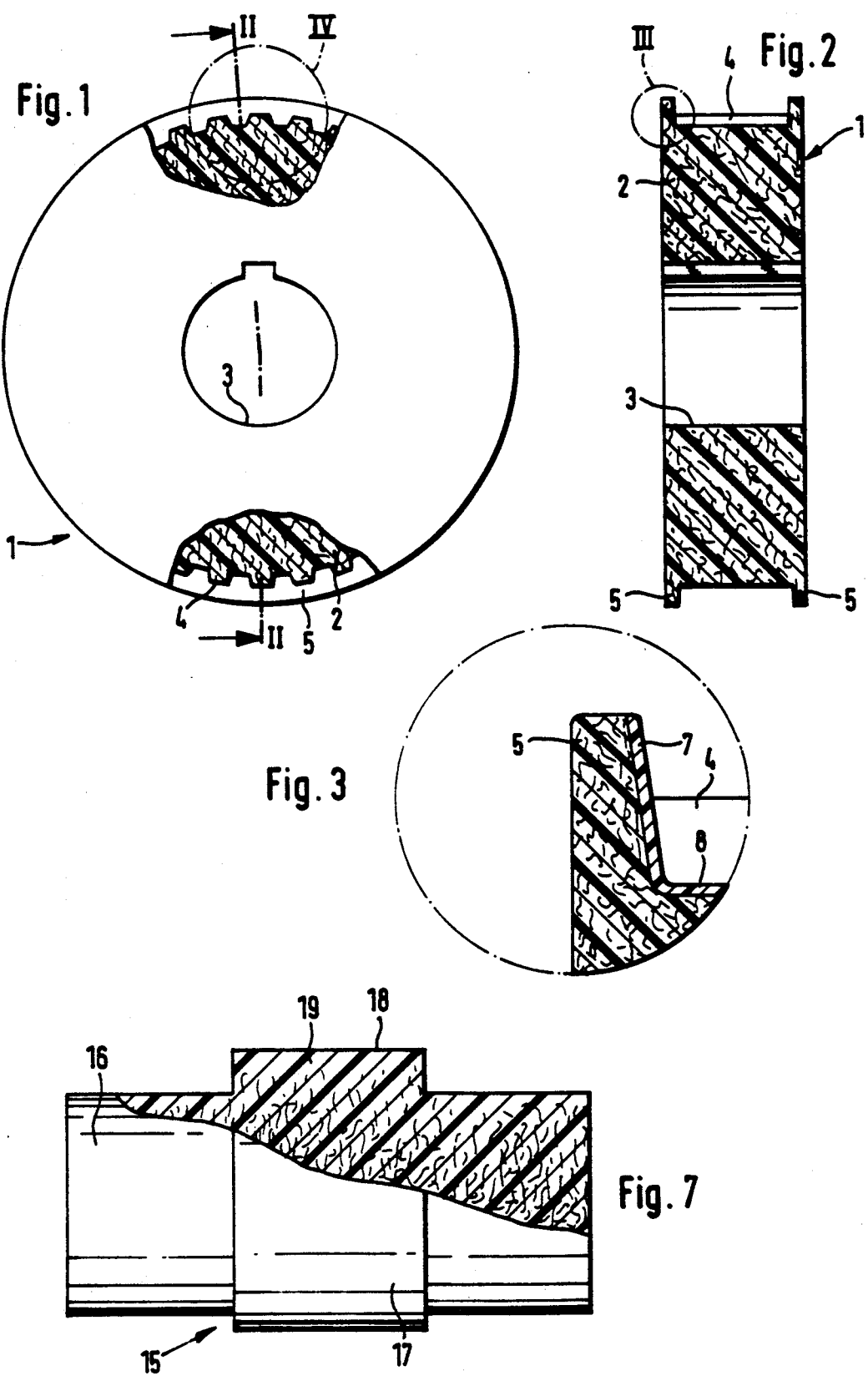

STRUCTURAL ELEMENT MADE OF REINFORCED POLYMERIC MATERIAL

PRIOR APPLICATION

This application is a continuation of U.S. patent application Ser. No. 820,258 filed Jan. 17, 1986, now abandoned.

STATE OF THE ART

Structural elements made of a castable or extrudable polymeric material reinforced by fillers, particularly by fibrous fillers, said structural elements having a contact surface in sliding engagement with another element, are known. Increased efforts have recently been made to use such structural elements because of their high resistance and rigidity, despite the problems that arise during interaction with other elements when the aforementioned structural elements are in sliding engagement with the other elements. The slip motions occurring may be related directly to the operation, e.g., in the case of a plain bearing, or they may also occur as an undesirable side effect, e.g., in the case of slip affected rolling motions such as are present between belt and pulley in V-belt, poly-V and flat belt drives, or in tooth-belt drives where relative motions between toothed belt and pulley occur despite the positive action principle.

It has been shown in the clutch release bearing with a filler-reinforced sliding sleeve which glides on a guide sleeve as described in DE-OS 30 25 705, that though the sliding sleeve does possess the required resistance, the surface of the guide sleeve is destroyed by abrasive wear due to the fillers that are also present on the contact surface of the sliding sleeve and the guide sleeve so that a faultless gliding of the sliding sleeve on the tube can no longer be assured.

Similar problems have arisen with known flat belt pulleys made of fibrous filler reinforced polymeric material so that the belt failed prematurely as a result of abrasive wear caused by slippage due to the fibrous fillers present on the contact surfaces of the belt pulleys.

OBJECTS OF THE INVENTION

It is an object of the invention to provide a structural element of reinforced polymeric material in which abrasive wear of the other element in sliding engagement with the contact surface is avoided without the structural element losing any of its resistance and rigidity.

This and other objects and advantages of the invention will become obvious from the following detailed description.

THE INVENTION

The structural element of the invention is made of a castable or extrudable polymeric material reinforced by fillers, said structural element having a contact surface in sliding engagement with another element, the structural element being provided on its contact surface with a layer, thin in comparison to the structural element's dimensions, of polymeric material free of fillers, the said layer being unitary with the structural element. Abrasive wear of the other element caused by the fillers can no longer occur and since the layer is thin in comparison to the dimensions of the structural element, there is no decrease in resistance and rigidity of the structural element.

Manufacture of the structural element preferably is performed in a single operation in which the material of the layer and that of the structural element are introduced essentially simultaneously into a mold through different channels. The two materials then combine at the area of contact between the layer and the structural element in a thermoplastic state. When the layer material has a melting point lower than the material of the structural element, the layer can be produced separately and then inserted into the mold and a homogeneous bond will be formed between the two materials when the material of the structural element is introduced into the mold since the layer material is again transformed into a thermoplastic state.

In one embodiment of the invention, the layer and the structural element may be made of the same polymeric material, while according a variation of the invention, the concentration of fillers decreases to zero concentration towards the contact surface.

Since in a variation of the invention, the polymeric material forming the layer exhibits good wear properties in the interaction with the material of the other element, the material of the structural element and the type and concentration of the fillers present in it can be optimally selected exclusively from the aspect of resistance and rigidity.

Should it be desirable in an embodiment of the invention that the wear characteristics be improved, the polymeric material forming the layer may contain a dry-film lubricant, while according to another variation of the invention, the amount of the dry-film lubricant in the polymeric material forming the layer is at least 0.25% by weight.

Referring now to the drawings:

FIG. 1 is a partial cross-section of an embodiment of the invention in the form of a toothed belt pulley.

Figure 5:
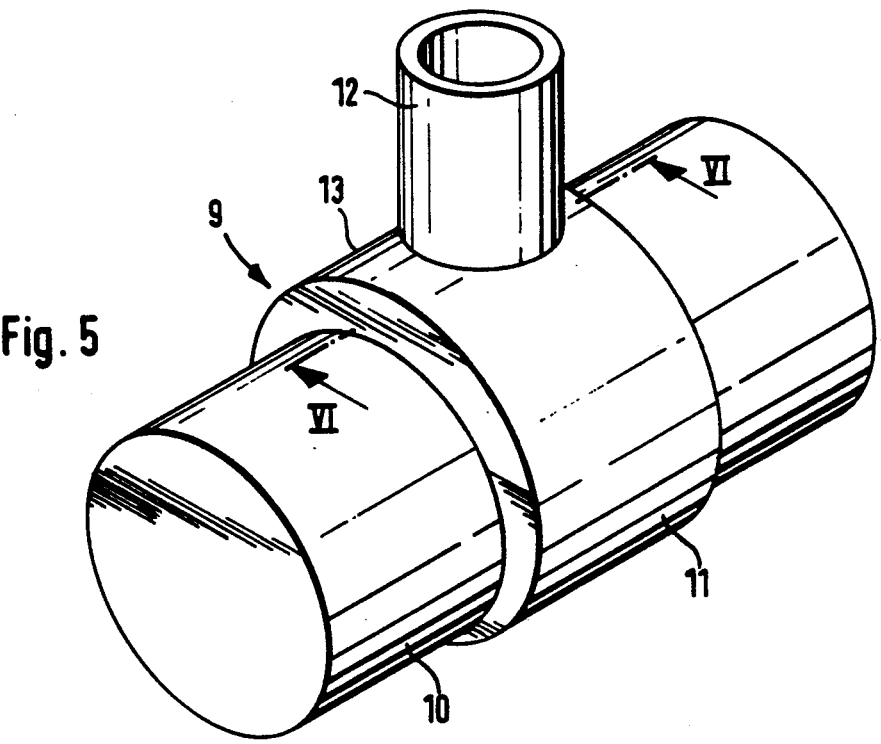
Figure 6:
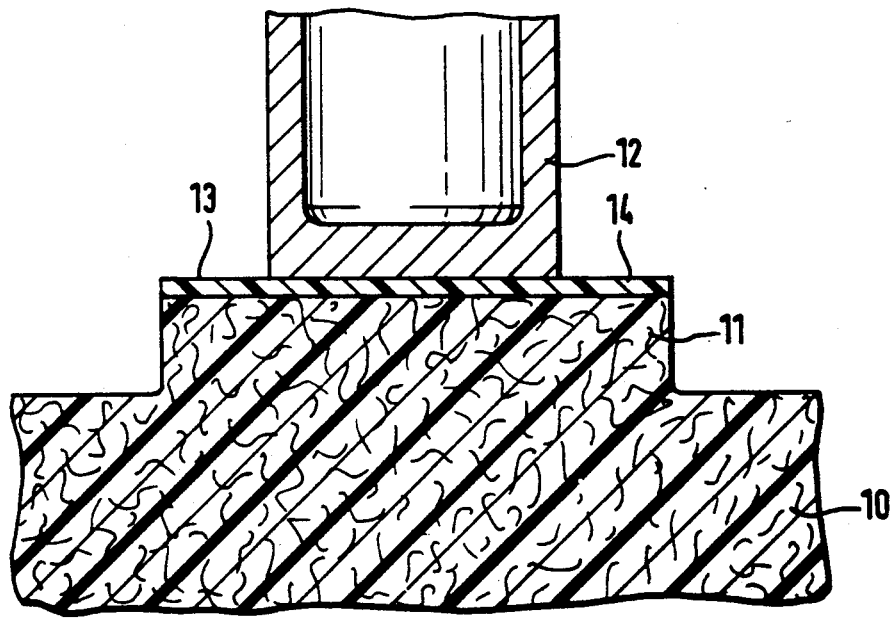

FIG. 2 is a cross-sectional view of the embodiment of FIG. 1 taken along line II—II, FIG. 3 is detail III of FIG. 2 on an enlarged scale, FIG. 4 is detail IV of FIG. 1 on an enlarged scale, FIG. 5 is a perspective view of another embodiment of the invention in the form of an eccentric shaft, FIG. 6 is a cross-section of the embodiment of FIG. 5 taken along line VI—VI in FIG. 5 and FIG. 7 is a partial cross-section of an eccentric shaft of the invention.

Referring to FIGS. 1 and 2, the toothed belt pulley 1 is comprised of a disk-shaped basic body 2 reinforced with fibrous fillers which is provided with a central bore 3, a gear-tooth system 4 arranged along the periphery of the basic body 2, and flanges 5 arranged at both sides of he gear-tooth system 4 which prevent a lateral run-off of the toothed belt from the toothed belt pulley 1 during operation.

It is known that, despite the positive action principle of the tooth-belt drive, relative motions occur both between the gears of the toothed belt and the toothed belt pulley, as well as between the flanks of the toothed belt and the flanges 5. Therefore, as shown in FIGS. 3 and 4, the entire surface 6 of the gear-tooth system 4 of toothed belt pulley 1 and that of faced 7 of flanges 5 facing the gear-tooth system 4 are provided with a thin layer 8 of a polymeric material which, as indicated by the hatching in FIGS. 3 and 4 differs from that of the basic body 2 and is free of fillers.

In FIG. 5, an eccentric shaft 9 is comprised of a shaft 10 which is provided with an eccentric part 11 and a tappet 12 is in sliding engagement with the outer surface 13 of the eccentric part 11. As indicated in FIG. 6 by the hatching, shaft 10 and eccentric part 11 are reinforced by fibrous fillers, but eccentric part 11 is provided at its circumference with a layer 14 of a polymeric material which, as can be seen from the hatching, is free of fillers.

FIG. 7 illustrates an eccentric shaft 15 reinforced by fibrous fillers both in the region of shaft 16 and in the region of eccentric element 17. However, the concentration of fillers present in eccentric shaft 15 decreases radially towards the outside so that eccentric element 17 has in the region of its outer surface 18 a layer 19 which is free of fillers.

In all the exemplified embodiments, the surface in sliding engagement with another element is always free of fillers so that abrasive wear caused by the fillers cannot occur. Since the thickness of the layer is insignificant in comparison to the dimensions of the respective structural element, the resistance and rigidity characteristics of the structural element are not negatively influenced.

Various modifications of the structural elements of the invention may be made without departing from the spirit or scope thereof and it should be understood that the invention is intended to be limited only as defined in the appended claims.

What I claim is:

1. A structural element made by single step casting or extruding polymeric material reinforced by fillers, said structural element having a contact surface in sliding engagement with another element, said structural element contact surface having been provided with, by said same casting or extruding, a layer, thin in comparison to the structural element's dimensions, of polymeric material free of fillers, said filler free polymeric material of said layer being integral with the filler-reinforced polymeric material of the structural element.

2. The structural element of claim 1 wherein the filler is a fibrous filler.

3. The structural element of claim 1 wherein the structural element and the layer are made of the same polymeric material.

4. The structural element of claim 3 wherein the concentration of fillers present in the structural element decreases to zero concentration towards the contact surface.

5. The structural element of claim 1 wherein the polymeric material forming the layer exhibits good wear characteristics in the interaction with the material of the other element.

6. The structural element of claim 1 wherein the polymeric material forming the layer contains a dry-film lubricant.

7. The structural element of claim 6 wherein the amount of the dry-film lubricant in the polymeric material forming the layer is at least 0.25% by weight.

* * * * *